UNITED STATES PATENT OFFICE.

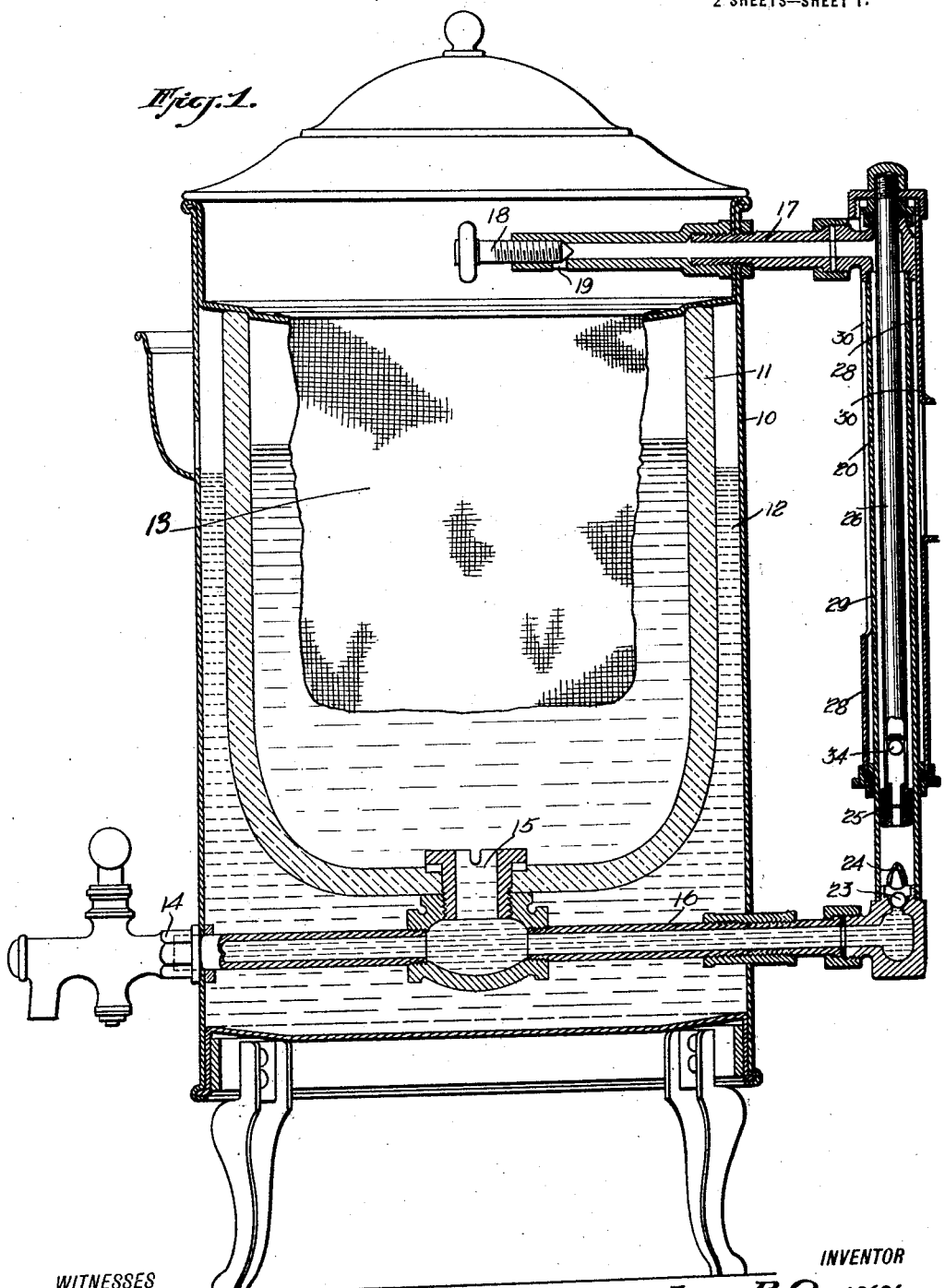

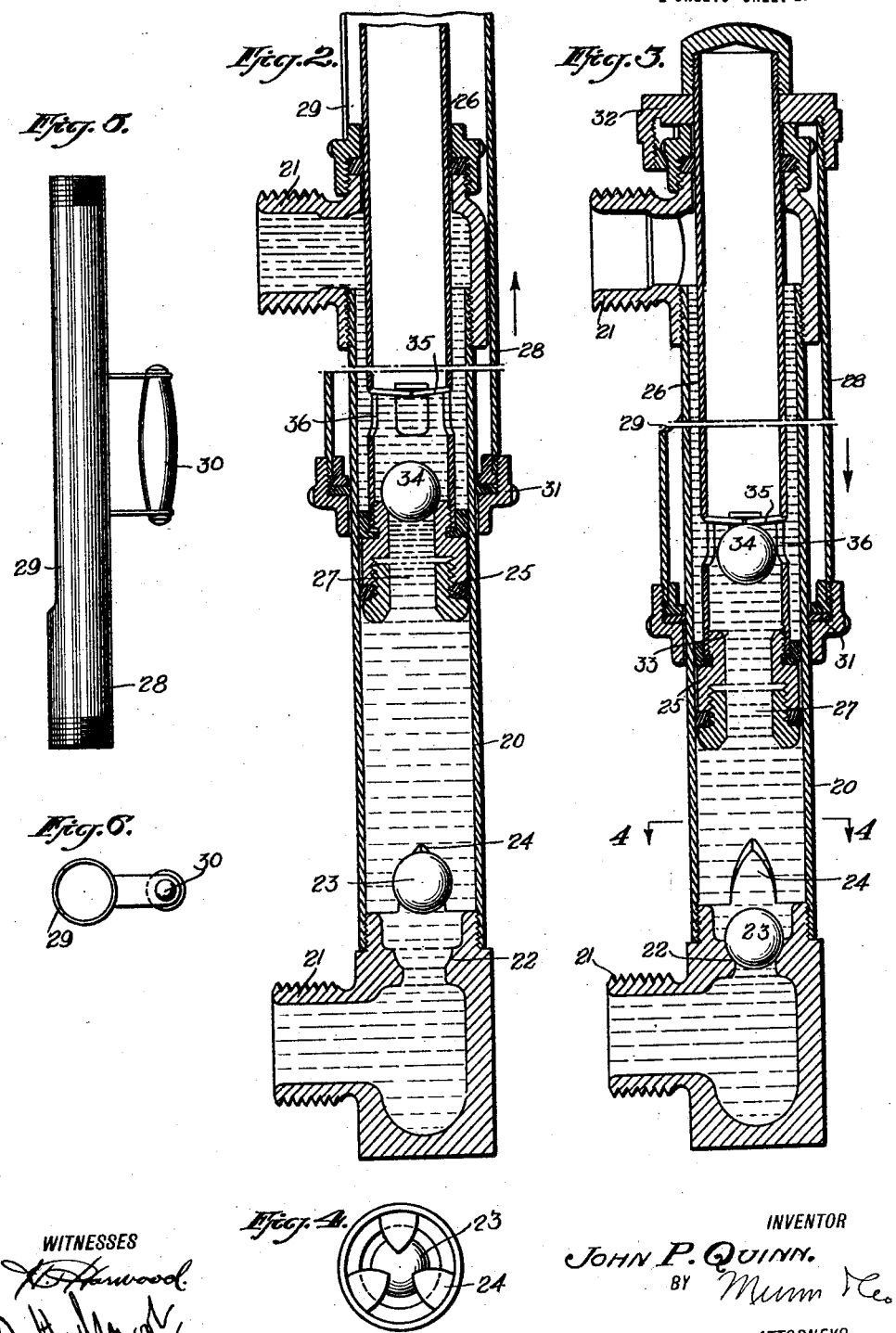

JOHN PATRICK QUINN, OF NEW YORK, N. Y.

REPOURING ATTACHMENT.

1,406,892.     Specification of Letters Patent.     Patented Feb. 14, 1922.

Application filed April 26, 1921. Serial No. 464,549.

*To all whom it may concern:*

Be it known that I, JOHN P. QUINN, a citizen of the United States, and resident of the city of New York, borough of Bronx, county of Bronx, State of New York, have invented a new and Improved Repouring Attachment, of which the following is a full, clear, and exact description.

My invention aims to provide certain new and useful improvements in connection with receptacles and more particularly intends to provide a repouring attachment for the receptacle.

In connection with percolators which are utilized for the percolating and dispensing of beverages in restaurants, it is a well appreciated fact that it has heretofore been customary for an operator to draw a certain amount of liquid from the receptacle into a pot, and to repour this liquid into the open upper end of the receptacle to insure a thorough mixing, and even distribution of the coffee or other beverage being prepared.

Obviously this expedient has offered numerous objections in that it consumed a great amount of time of the operator, and also is far from satisfactory, incident to the fact that the fluid splashes in being repoured, and if this occurs in any quantity, the operator is liable to become injured, due to the heat of the fluid.

With this in mind, my present invention aims to provide an attachment for association with percolators, although my invention is not necessarily limited to this particular adaptation, and by means of which the operator may readily effect a withdrawal of a certain amount of the fluid from the base of the receptacle, and a reintroduction of the same at the upper end of this receptacle.

A further object of this invention is the construction of a device of the nature specified which will be extremely simple, and by means of which any danger of the operator becoming injured is eliminated.

Further objects of this invention will appear in the annexed specification taken in connection with the drawings which latter illustrate one practical embodiment of the same, and in which;

Figure 1 is a sectional side view taken through a receptacle of the nature specified, and showing my attachment associated therewith.

Figure 2 is an enlarged sectional view of the attachment and showing the same in the act of effecting a repouring.

Figure 3 is a view similar to Figure 2 but showing the attachment refilled.

Figure 4 is a sectional plan view taken along the line 4—4 and in the direction of the arrows indicated in Figure 3.

Figure 5 is a side view of one of the elements of the attachment and showing the same detached therefrom, and Figure 6 is a plan view of this element.

In the embodiment illustrated the reference numeral 10 in Figure 1 indicates a conventional percolator within which is housed a beverage jar 11, the latter being spaced from the side walls of the receptacle 10 to provide the usual hot water jacket 12. Furthermore the bag 13 is positioned within the jar 11, and this bag in the usual manner is adapted to contain the substance from which the beverage is prepared, it being noted that the beverage is withdrawn from the percolator by means of the customary faucet 14 connected to the jar or urn 11 as at 15.

Contrary to this conventional construction, however it will be seen that the connection 15 provides an additional opening permitting of the attachment thereto of a pipe 16 which extends to a point beyond the body of the percolator 10, and substantially in line with the outer end of a pipe 17 having its inner end extending within the percolator, and at a point above the bag 13.

Thus it will be obvious that if an impelling element is utilized that fluid may be withdrawn through the pipe 16 and introduced into the pipe 17 to effect a repouring of the liquid, thus accomplishing the object of this invention, and it is to be noted in this connection that a valve 18 is preferably associated with the pipe 17, to regulate the flow of fluid therefrom through the opening 19.

The impelling element utilized is best illustrated in Figures 2 and 3, and as will be seen by referring to these figures, is in the nature of a pump. This member includes a cylinder 20 provided with nipples 21 adjacent the upper and lower ends, permitting of its being connected to the pipes 16 and 17 respectively.

Within the cylinder 20 and preferably at a point adjacent the lower end of the same there is provided a valve seat 22 with which a valve 23 co-operates, the movement of the latter being limited by any suitable means such as a plurality of inwardly extending ears 24, at a point above and spaced from the body of the valve 23. Further a piston 25 is slidably mounted within the cylinder 20 and it is to be noted that the rod of the piston is preferably formed by utilizing a tubular member 26, which latter aligns with a bore 27 forming a part of the piston 25.

To effect a reciprocation of the piston within the cylinder, I utilize an operating member in the nature of that illustrated in Figures 5 and 6. This element includes a sleeve 28 which is split as at 29 throughout the greater part of its length and has an operating handle 30 affixed to it whereby the same may be slid longitudinally of the cylinder 20 with which it is in slidable engagement by means of contact rings 31 secured adjacent its upper and lower ends.

Also secured adjacent the upper end of the tubular member 28 is a cap 32 which may be interiorly screw threaded to permit of its being attached to the upper end of the rod of the piston. Thus a movement on the part of the handle 30 will permit of the piston 25 being reciprocated within the cylinder, and it is to be noted that the split portion 29 will permit the sleeve 28 to straddle the uppermost nipple 21 aside from the fact that the unsplit portion of the sleeve will limit the movement of the latter.

It is also to be noted that a secondary valve seat 33 is formed in the upper edge of the piston 25 and this valve seat co-operates with the valve 34 movably mounted within the tube 26, it being noted in this case also that a movement of the valve 34 is limited by means of prongs 35 struck inwardly from the body of the tube 26 and thus providing openings 36 adjacent the upper limit of travel of the valve 34.

Thus it will be seen, reference being had to Figures 2 and 3 that a movement of the sleeve 28 in the direction of the arrows indicated in these figures will effect a seating of the valve 34 and unseating of the valve 23 thus causing fluid to be sucked from the jar 11 into the body of the cylinder. A reversal of movement on the part of the sleeve 28, as has been indicated in dotted lines in Figure 3 will result in an immediate seating of the valve 23 and an unseating of the valve 34 thus confining the fluid within the body of the cylinder but permitting the same to flow through the bore 27 lower end of the tube 26, openings 36 and into those portions of the cylinder above the piston. Again reversing the movement of the sleeve as in Figure 2 will now cause additional fluid to be sucked into the cylinder as has been aforedescribed, but in addition to this action the fluid in those portions of the cylinder above the piston will be forced from the body of the same incident to the fact that it is incapable of escaping past the piston and this fluid will now cascade through the tube 17 into the jar, this flow into the latter being regulated by the valve 18 where this member is utilized.

Thus I have provided an attachment of the nature brought out in the preamble of this specification, which is obviously not limited to the adaptation mentioned, but might be utilized to advantage in a number of different associations and by means of which the objects of this invention are accomplished.

It will be appreciated that numerous modifications of structure might readily be resorted to without in the least departing from the spirit of my invention, which I claim as;

1. A repouring attachment including a cylinder, nipples secured adjacent the upper and lower ends of said cylinder and affording communication with the interior thereof, a piston movably mounted within said cylinder, valves co-operating with said piston, a piston rod secured to said piston and extending beyond the end of said cylinder, and a sleeve formed with a split extending throughout the greater part of its length, and straddling one of said nipples said sleeve being connected to said rod.

2. A repouring attachment including a cylinder, nipples secured adjacent the upper and lower ends of said cylinder and affording communication with the interior thereof, a piston movably mounted within said cylinder, valves co-operating with said piston, a piston rod secured to said piston and extending beyond the end of said cylinder, a sleeve formed with a split extending throughout the greater part of its length, said sleeve being connected to said rod, and a handle secured to said sleeve the circular portion of said sleeve lying between said nipples and encircling said cylinder.

3. A repouring attachment including a cylinder nipples secured adjacent the ends of said cylinder and affording communication with the interior thereof, a piston within said cylinder, a piston rod secured to said piston and extending from one of the ends of said cylinder, a sleeve having one of its ends connected to the outer end of said piston rod its opposite end slidably encircling said cylinder, said sleeve being formed with a split portion throughout a greater part of its length, and straddling one of the nipples associated with said cylinder.

JOHN PATRICK QUINN.